Aug. 22, 1939.  C. I. JUSTHEIM  2,170,332
REFRIGERATOR
Filed April 19, 1937  2 Sheets-Sheet 1
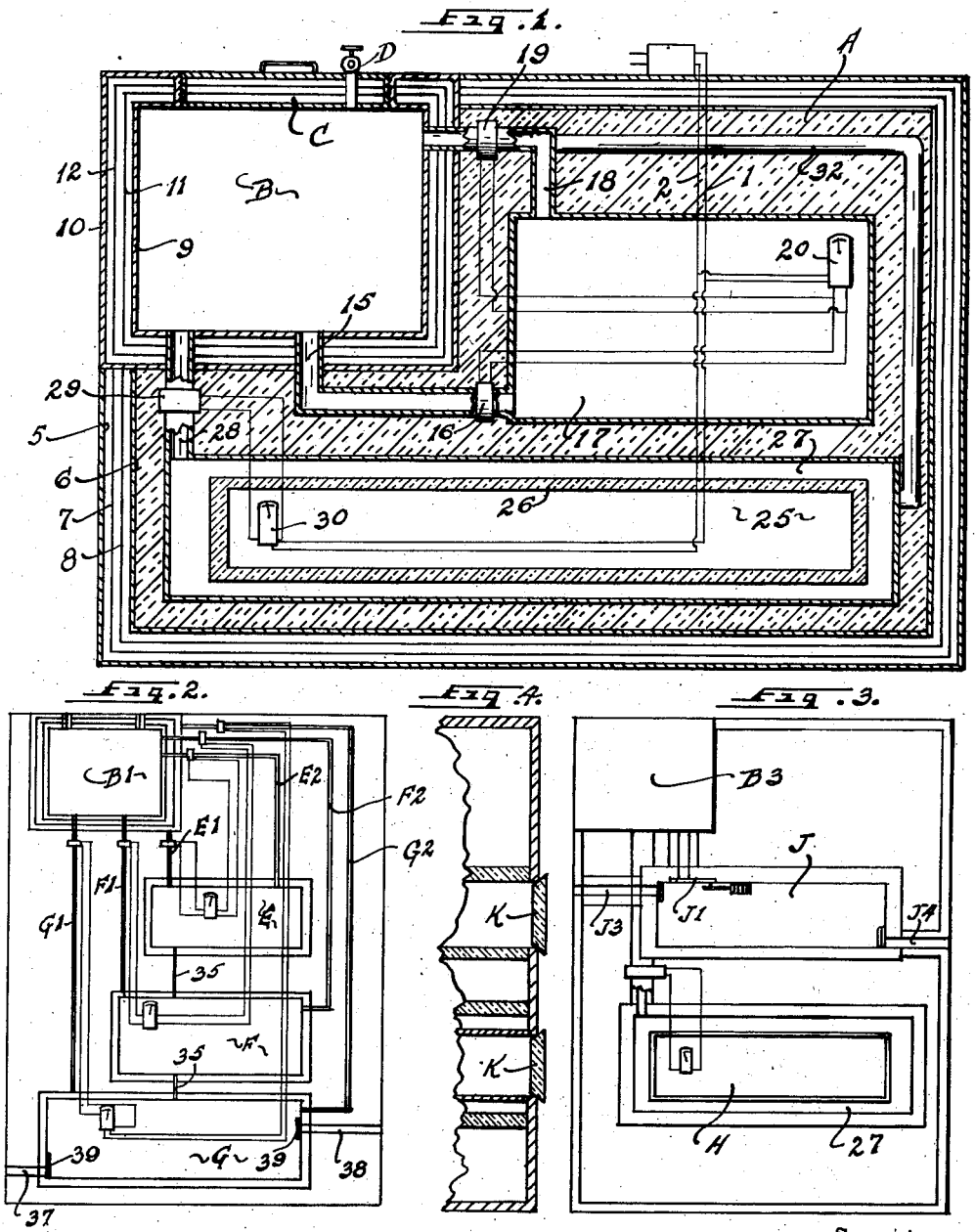
Inventor
Clarence I Justheim.
By R. M. Thomas
Attorney Aug. 22, 1939.　　　C. I. JUSTHEIM　　　2,170,332
REFRIGERATOR
Filed April 19, 1937　　　2 Sheets-Sheet 2
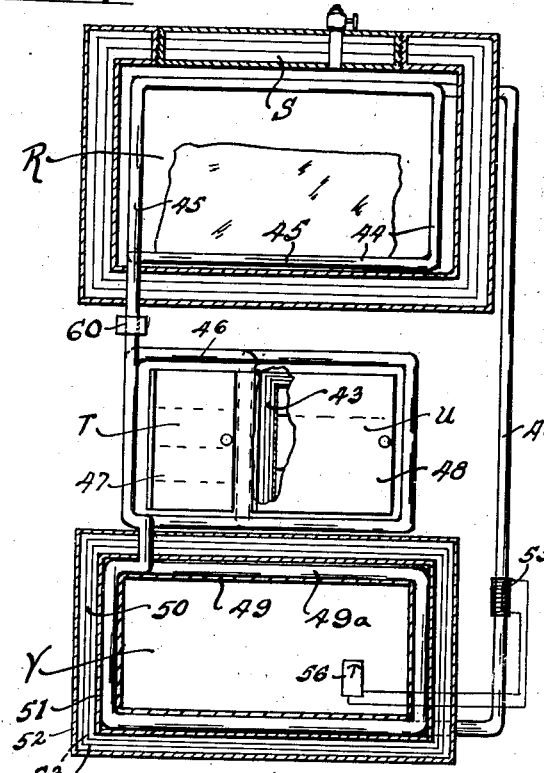
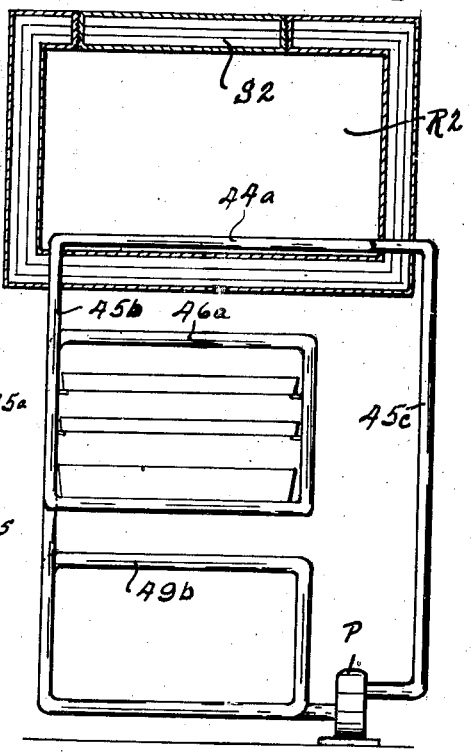
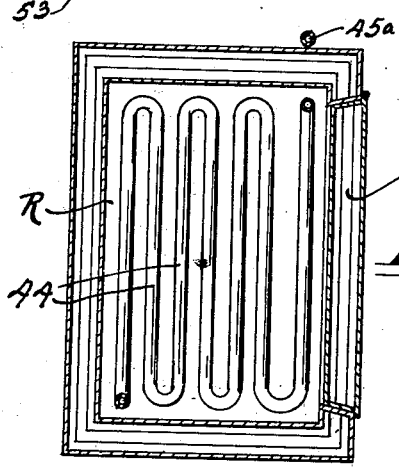
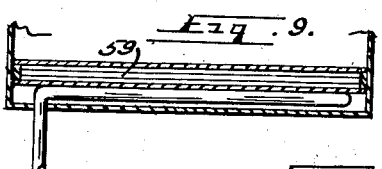
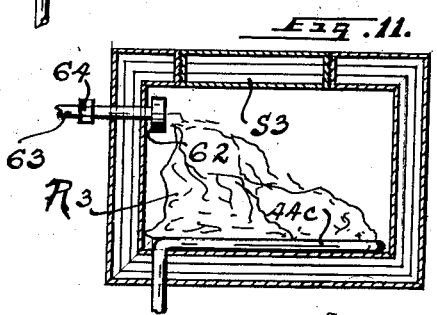
Inventor
Clarence I. Justheim
By R. M. Thomas
Attorney Patented Aug. 22, 1939

2,170,332

UNITED STATES PATENT OFFICE 2,170,332

REFRIGERATOR

Clarence I. Justheim, Salt Lake City, Utah

Application April 19, 1937, Serial No. 137,607

4 Claims. (Cl. 62—91.5)

My invention relates to refrigeration and has for its object to provide a new and efficient refrigerator which will use solid carbon dioxide, commonly called "dry ice", and which will have a compartment for holding the dry ice in a closed compartment which will be completely insulated and which will hold the solid carbon dioxide a great period of time without allowing it to sublime.

A further object is to provide a chamber in which solid carbon dioxide may be placed and held over a long period of time by proper insulation and which chamber is connected with food storage compartments by suitable conduits to carry the sublimed gas from the chamber to the compartments to cool them with gas, either directly into the compartment, or into a surrounding envelope, chamber, or coil, to cool the compartment and with insulation employed in, around, or between, the storage compartment and the gas holding medium.

A still further object is to provide a solid carbon dioxide chamber completely insulated against outside temperatures and to hold the solid carbon dioxide from subliming due to exterior heat and which chamber is connected with food storage compartments by thermostatically controlled conduits, one leading into the compartment and the other to return the gas to the storage chamber to completely control the sublimation of the solid carbon dioxide by the temperature in the food storage compartments.

A still further object is to provide a refrigerator having an insulated solid carbon dioxide chamber, completely closed and insulated to hold the solid carbon dioxide a long period of time with very small sublimation and a refrigerating compartment in which food is stored with the refrigerating medium a conduit leading from a coil in the carbon dioxide chamber to surround the storage compartment to transmit cold thereto with a return flow to make a complete refrigerating cycle.

These and other objects I accomplish with the device illustrated in the accompanying drawings in which similar numerals and letters of reference indicate like parts throughout the several views and as described in the specification forming a part of this application and pointed out in the appended claims.

In the drawings in which I have shown my invention—

Figure 1 is a sectional view of a refrigerator having a solid carbon dioxide chamber, a direct flow compartment, and an insulated enveloped compartment.

Figure 2 is a diagrammatic view of a modified type of device in which three food compartments are used with the insulated dry ice compartment with return flow of the gas, thermostatic control of the flow of the gas, and flow of atmospheric air from outside through one of the food compartments.

Figure 3 is a diagrammatic view of a still further modified device in which the food compartment is thermostatically controlled by the flow of gas, with inlet and outlet of air and with a second compartment insulated and having the gas surrounding it thermostatically controlled.

Figure 4 is a section through the refrigerator showing the doors for each compartment so that each compartment will have a door of its own.

Figure 5 is a plan view of one food compartment having a coil surrounding the compartment instead of a gas chamber or envelope.

Figure 6 is a vertical section of a refrigerator having a "dry ice" chamber insulated and contained within itself and with no gas outlets, but carrying a cooling coil to carry a secondary refrigerant to other compartments in which food is stored or ice is formed.

Figure 7 is a modified form showing a pump for adding the flow of the secondary refrigerant in the coil.

Figure 8 is a section looking down on the cooling coil shown to be used under the "dry ice" with a door in the front of the chamber rather than in the top as shown in the other figures.

Figure 9 is a section of one of the "dry ice" chambers showing an insulated plate to be used between the "dry ice" and the coils, continuing the secondary refrigerant.

Figure 10 is an enlarged section of one of the sheets of foil showing the approved form.

Figure 11 is a view of a modified type of device in which the solid carbon dioxide is formed as snow in the solid carbon dioxide chamber from an exterior source of carbon dioxide gas under pressure.

This is a continuation in part of my applications for Refrigerator, Ser. No. 743,857 filed September 13, 1934, now matured into Patent No. 2,107,538, issued February 8, 1938, and Refrigerator, Ser. No. 754,795 filed November 26, 1934, now matured into Patent No. 2,089,965, issued August 17, 1937.

In Figure 1 I have shown a vertical section of a refrigerator shown as casing A with an outside layer or form of insulation made by sheets made of material 5 and 6 held spaced apart and carrying sheets of spaced apart highly reflective foil 7 and 8 therebetween to reflect the heat and cold and insulate the casing. Within this casing in one corner at the top I provide my "dry ice" or solid carbon dioxide chamber B which chamber is also formed of inner and outer walls 9 and 10, spaced apart and carrying sheets 11 and 12 of foil insulation therebetween to completely insulate the exterior of this chamber.

In the top as shown in Figure 1 there is an opening provided with a closure or door C therefor, said closure or door being formed of like construction to the chamber B and is shown screwed into closed position in order to insure a permanent sealed closure. The solid carbon dioxide is placed in the chamber and the door closed. Thus, with perfect sealing and perfect insulation the carbon dioxide in the solid form will last much longer than ordinarily is the case. In the closure or through one wall of the chamber there is a pressure release valve D adapted to release when a predetermined pressure has been generated in the chamber through sublimation of the carbon dioxide and which valve D also being manually controlled so that when a new supply of solid carbon dioxide is needed it may be supplied by first releasing the pressure in the chamber through the valve and then screwing out the door.

Leading from the bottom of the chamber B there is a conduit 15 having a thermostatically controlled valve 16 therein and leading into a food storage compartment 17. This food compartment 17 has a return flow conduit 18 leading into the top of the chamber B to complete a cycle for circulation of the sublimed solid carbon dioxide gas from the chamber B into the compartment 17 and back to the chamber again to control the sublimation of the $CO_2$. A thermostat 20 controls the valve 16 in the conduit 18 and electrical energy is supplied through lead in wires 1 and 2 from a source of electrical energy. The valve 19 in the pipe 18 is provided to control the flow of gas into the compartment 17 and the valve is controlled by the thermostat 20 or an independent thermostat if desired. Below this compartment there is another compartment 25 surrounded by insulating walls 26 and said walls 26 being completely surrounded by a gas chamber 27 which chamber is connected with the chamber B by a conduit 28 carrying a control valve 29 therein to control the flow of gas from the chamber B into the gas chamber 27.

A thermostat 30 in the food storage compartment 25 controls this valve 29 and also controls a like valve not shown but which would be back of the valve 19 and connected into the conduit 32 which leads from the gas chamber 27 back into the chamber B to complete the circulation of cold gases from the chamber B into the gas chamber 25 and back to the chamber B. In some cases the later described valve may be eliminated. The circulation thus created causes just the proper amount of sublimation and movement of the gas from the solid carbon dioxide to insure the desired temperature in both food storage compartments. Also the compartment 25 may have the temperature controlled by being built with a certain predetermined degree of insulation in case the gas directly into the chamber is too cold.

As will be obvious the insulation shown may be replaced by aluminum or other types of reflective foil as is shown surrounding the entire casing. Any space in the casing A surrounding the food storage compartments or the gas chamber or conduits may be filled with insulation or not as desired.

In Figure 2 I have shown three food compartments E, F, and G, each connected with the one above by a conduit 35, and each connected with the solid carbon dioxide chamber B1 by conduits E1, F1, and G1. Each of the conduits may carry control valves thermostatically controlled and each compartment is connected with the top of the chamber B1 by return flow conduits E2, F2, and G2.

The compartment is shown with thermostatically controlled ports 37 and 38 leading from the atmosphere into the compartment, the port 37 being directed to the lower side of the compartment and the port 38 from the top side to insure flow of air through the compartment when the control thermostats 39 operate to open the ports.

Figure 3 shows a modified form of device in which the solid carbon dioxide chamber B3 is connected to two food compartments H and J by thermostatically controlled conduits one being a slide valve type shown as J1 and the other the type shown in the other figures of the drawings. Neither of these chambers is provided with a return flow circuit and the top chamber J is provided with thermostatically controlled inlet and outlet ports J3 and J4 for inflow and outflow of atmospheric air.

Figure 4 shows a vertical section through a refrigerator such as shown in Figure 1 or Figure 3 with the doors K for each separate food compartment.

Figure 5 shows a food compartment surrounded by a coil L instead of a gas chamber 27 as shown in the lower chambers of Figures 1 and 3.

In Figure 6 I have shown my same type of completely insulated carbon dioxide chamber R having a closure S in the top thereof but said chamber is then provided with a secondary refrigerant carrying coil 44 of suitable pipe 45 said pipe leading down and in a coil 46 surrounding a quick freezing section T in which ice trays are set on shelves for quick freezing of water and then the pipe 45 extends around an insulated compartment U in which foods may be kept requiring a certain degree of cold, the degree of cold being controlled by the amount of insulation or the thickness thereof. In this particular showing, I have shown the insulation wall 43 aluminum foil set between suitable walls. Each of these compartments are provided with doors 47 and 48 and the coil is then extended down and around the inside walls of an insulated compartment V said compartment being made of an inner casing 49 around which the coil 49a is wound and the coil 49a is then surrounded by the insulated walls 50 made as shown of inner and outer walls 51 and 52 spaced apart and carrying sheets of foil 53 therebetween. The coil then extends up outside the food compartment in a pipe 45a and back into the top of the chamber R to the place of beginning to provide a sealed coil for the secondary refrigerant. This secondary coil carries a suitable refrigerant such as sulphur dioxide, ammonia and distilled water, or other commercial forms of refrigerants and the placing of the solid carbon dioxide on the coil transmits the extreme cold directly to the refrigerant in the coil causing it to pass downward and allowing the warmer refrigerant in the outer part of the coil and the outside pipe to rise into the chamber R. If the degree of movement is sluggish, it may be accelerated by a heater coil 55 and control thermostat 56 in the casing or compartment V. If the direct contact of the solid carbon dioxide to the coil is too cold, the dry ice or solid carbon dioxide may be placed on a plate 59 of insulation such as shown in Figure 9 of the drawings to decrease the transmission of cold.

In the pipe 45 between the coil 44 and the coil 46 I provide a valve 60 to shut off the flow of refrigerant through said secondary system when necessary, to be partly closed to retard the flow of refrigerant through said system.

In Figure 7 I have shown the solid carbon dioxide chamber as R2, with a closure S2 therefor and having a coil 44a mounted on the bottom of the chamber only. A pipe 45b from which the coil is formed extends down into a coil 46a which forms a freezing chamber for suitable trays shown, and then extends down into a coil 49b similar to the coil 49a in Figure 6, said coil not being shown in a chamber but, which coil may be used to cool a chamber such as shown as V in Figure 6 or may be outside a chamber, inside a chamber, or any other suitable method of use to transmit the cold from the coil to the chamber.

A pump P is then placed in the pipe line 45c where it extends up to the coil 44a again and this pump may be controlled as desired to cause flow of the refrigerant such as sulphur dioxide, ammonia, or like refrigerants, said pump only being used to cause a flow of the refrigerants through the chamber R2.

If it is found that the solid carbon dioxide is too cold when resting directly on the coil 44, the coil may be insulated by a strip of insulation 59 therebetween such as shown in Figure 9 or this insulation may be of any commercial type and of any thickness desired.

Figure 10 shows a section of a portion of one sheet of aluminum foil which may be necessary to use where extreme insulation is desired. This form which may be necessary to use has the foil made into concave and convex facets or surfaces, being concave on one side and convex on the opposite side to disperse the heat rays from one side and collect them in concentrated rays on the opposite side of the foil.

In Figure 11 of the drawings I have shown a modified type of device in which the carbon dioxide chamber is shown as R3, having a closure S3 therefor and with a coil 44c carried in the bottom end thereof and extending down to surround the food storage compartments (not shown).

To provide the cold in the chamber R3 I introduce a lead in pipe 63 having a connection 64 therein and carrying a discharge valve 62 on the inner end thereof said valve to control the flow of carbon dioxide gas under pressure into the chamber R3 where it is liberated through the valve 62 to form carbon dioxide snow as a refrigerant for cooling the coil 44c. The carbon dioxide under pressure is carried in a separate tank and the connection 64 is provided to make the connection thereto when a new supply is needed.

Having thus described my invention, I desire to secure by Letters Patent and claim:

1. In a solid carbon dioxide refrigerator, the combination of a self enclosed completely insulated carbon dioxide chamber; means to insert and seal solid carbon dioxide in said chamber; means to relieve pressure from said chamber; a conduit leading from said chamber; a food storage compartment connected with said conduit; a return conduit from said compartment back to said chamber; thermostatic means to control the flow of gas through either conduit to hold the temperature in the compartment at a predetermined temperature; another food storage compartment mounted with a conduit leading into a surrounding gas envelope; a return flow from said gas envelope to said carbon dioxide chamber; and insulation surrounding said last mentioned food compartment between the gas envelope and the interior of the compartment; and thermostatic means to control the flow of gas into the envelope by the temperature in the compartment.

2. A refrigerator of the class described comprising a casing properly insulated; a solid carbon dioxide chamber, separately insulated, mounted in one upper portion of said casing; food storage compartments mounted in said casing; means to introduce gas from said chamber directly into one of said food storage compartments; means to introduce gas from said chamber into a surrounding gas chamber around another food storage compartment; means in said compartments to control the flow of gas from said chamber to control the temperature in each compartment independently; and means to insulate one of said compartments to decrease the extreme cold of the gas surrounding it.

3. A carbon dioxide refrigerator of the class described, comprising separate food compartments; doors for each compartment to close the compartment; a gas chamber formed around one compartment to provide a thin area of gas surrounding the compartment; insulation between the compartment and the gas chamber; a solid carbon dioxide chamber insulated and sealed to hold solid carbon dioxide a long period of time; means to introduce gas from said solid carbon dioxide chamber into said gas chamber; means to introduce gas from said solid carbon dioxide chamber into another food compartment; means to connect each compartment with the top of the solid carbon dioxide chamber for return flow of the cooling gas; and thermostatic means in each compartment to control the temperature in the individual compartments independently of the other.

4. A carbon dioxide refrigerator of the class described comprising separate food compartments; doors for each compartment to close them; a gas chamber formed around one compartment to provide a thin area of gas surrounding the compartment; insulation between the compartment and the gas chamber; a solid carbon dioxide chamber insulated and sealed to hold solid carbon dioxide a long time; means to introduce gas from said solid carbon dioxide chamber into said gas chamber; means to introduce gas from said solid carbon dioxide chamber into one food compartment; and thermostatic means in each compartment to control the temperature in the individual compartments independently of the other.

CLARENCE I. JUSTHEIM.